(12) United States Patent
Ouimet

(10) Patent No.: US 8,190,486 B1
(45) Date of Patent: May 29, 2012

(54) TECHNIQUES FOR PRODUCT SELECTION

(75) Inventor: Kenneth J. Ouimet, Scottsdale, AZ (US)

(73) Assignee: MyWorld, Inc., Scottsdale, AZ (US)

( * ) Notice: Subject to any disclaimer, the term of this patent is extended or adjusted under 35 U.S.C. 154(b) by 5 days.

(21) Appl. No.: 12/804,268

(22) Filed: Jul. 15, 2010

(51) Int. Cl.
*G06Q 30/00* (2006.01)

(52) U.S. Cl. ..................................... 705/26.1

(58) Field of Classification Search .................. 705/26.1
See application file for complete search history.

(56) References Cited

U.S. PATENT DOCUMENTS

| | | | |
|---|---|---|---|
| 7,672,876 B2 | 3/2010 | Bonner et al. |
| 7,734,513 B2 | 6/2010 | Bonner et al. |
| 7,739,157 B2 | 6/2010 | Bonner et al. |
| 7,742,952 B2 | 6/2010 | Bonner et al. |
| 7,783,527 B2 | 8/2010 | Bonner et al. |
| 7,792,710 B2 | 9/2010 | Bonner et al. |
| 7,848,964 B2 | 12/2010 | Bonner et al. |
| 7,917,405 B2 | 3/2011 | Bonner et al. |
| 2004/0117290 A1* | 6/2004 | Shacham ...................... 705/37 |
| 2006/0080274 A1* | 4/2006 | Mourad ........................ 707/1 |
| 2007/0255696 A1* | 11/2007 | Desbarats .................... 707/3 |

OTHER PUBLICATIONS

Wishabi Unveils New e-Commerce Technology; Lets Shoppers Make Smarter Buying Decisions to Get the Best Available Deals; Marketwire. Toronto: Jul. 8, 2009. ; http://proquest.umi.com/pqdweb?did=1779199571&sid=2&Fmt=2&clientId=19649&RQT=309&VName=PQD.*

* cited by examiner

*Primary Examiner* — Mila Airapetian
(74) *Attorney, Agent, or Firm* — Robert D. Atkins; Patent Law Group: Atkins & Associates, P.C.

(57) ABSTRACT

Techniques for selecting a product are disclosed. A user-specific product value specific to a user is determined for each of at least a subset of a set of a plurality of products. The user-specific product value is based at least in part on a user-specific product attribute value associated with a product attribute specific to the user. A product is selected from the set of a plurality of products, the selection is based at least in part on the determined user-specific product values.

27 Claims, 11 Drawing Sheets

FIG. 7

Today's Shopping List

My Location is San Francisco, CA    Login / Register
My Stores: CVS, Raley's, Safeway, Target, Walgreens, Wal-Mart Shopping List
4 items, $23.56    Print   Email

| | Qty | Product | | | Recommended Product | Lowest Price |
|---|---|---|---|---|---|---|
| X | 1 [+/-] | Eggs | 7 Stores / 880 Items | Best | O Organics Organic Grade A Large Brown Eggs, 12 Ct | Safeway $3.99 |
| X | 2 [+/-] | Refried Beans | 7 Stores / 387 Items | Best | Amy's Organic Vegetarian Refried Beans with Green Chilies, 15.4 oz | Safeway $1.79 |
| X | 1 [+/-] | Bananas | 7 Stores / 45 Items | Best | Organic Bananas | Wal-Mart $0.25 |
| X | 1 [+/-] | Olive Oil | 7 Stores / 150 Items | Best | O Organics Extra Virgin Olive Oil, 33.8 fl oz | Safeway $14.99 |

Enter item here [ADD]

How do I get better product recommendations?

Savings 15%, Allergens 73%, Diet, Health & Nutrition 84%, Life Style 100%, Environment 40%, Society 68%

Privacy Policy | Usage Policy | Copyright | About    Feedback

FIG. 9

TECHNIQUES FOR PRODUCT SELECTION

BACKGROUND OF THE INVENTION

When selecting a product or service to buy, a shopper may consider factors such as his/her social (e.g., environmental), health, financial, and/or other objectives. The shopper translates these objectives into product attributes that reflect the extent to which particular products are aligned with the shopper's objectives. Typically, when given a choice a shopper will choose a product, for example a specific brand, size, type of container, etc., that meets at least to some minimum degree the objectives the shopper desire to achieve through the purchase. The shopper may have to make tradeoffs between different attributes. To an average shopper, this product selection process is often difficult and time consuming, especially when the number of products to choose from is large and different products have different sets of product attributes, product information is scattered and it is not always obvious to the shopper which product attribute(s) will influence the user's objectives without requiring close examination.

BRIEF DESCRIPTION OF THE DRAWINGS

Various embodiments of the invention are disclosed in the following detailed description and the accompanying drawings.

FIG. 7 is a screen shot of a graphical user interface for receiving user selection of product attribute for association with a product category for receiving product recommendation for the product category, and for receiving user selection as to whether to define a selected product attribute as an always-requirement, never-requirement, or preference level.

FIG. 9 is a screen shot of an embodiment of a graphical user interface for displaying product recommendation to user.

DETAILED DESCRIPTION

Figure 1:
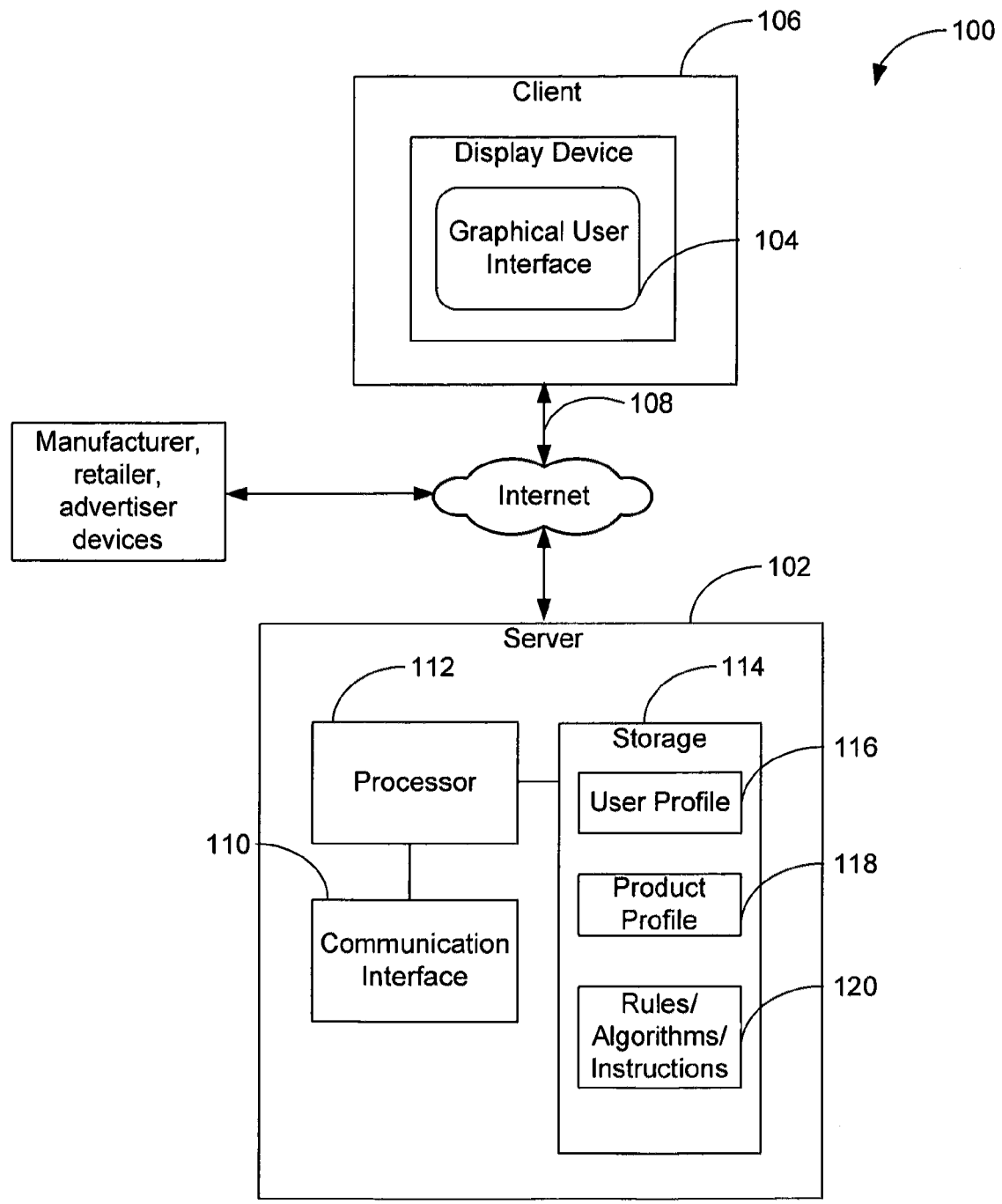
FIG. 1 is a block diagram illustrating an embodiment of a system for recommending products to users.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for recommending products to users are disclosed. In some embodiments, user-associated product values reflecting the value of that product to that particular user are determined for each of a subset of a set of a plurality of products. In some embodiments, the product values are determined based on one or more user-associated or user-specific individual product attribute values reflecting the value to that particular user of each such product attribute in the context of that product. The user-specific product attribute values may be specified and adjusted by the user via a user interface. In some embodiments a list comprising one or more products selected from the products in a product category is generated and displayed or otherwise communicated to a user.

In some embodiments, the set of a plurality of products belong to or are selected from a product category or subcategory, or a group of substitutable products. In some embodiments, selecting the product includes selecting a product having the highest user-specific product values from the set of products. In some embodiments, selecting the product includes selecting a plurality of products having the highest user-specific product values from the set of products. In some embodiments, selecting the product includes displaying or otherwise communicating the selected products to a user. In some embodiments, the user-specific product value is based at least in part on a plurality of user-specific product attribute values associated with a plurality of product attributes. In some embodiments, the user-specific product value is normalized. In some embodiments, the user-specific product value is measured as a difference between a determined user-specific product value and a baseline value. In some embodiments, the user-specific product value is normalized for example against the product size, quantity, or purchase price by dividing a determined user-specific product value by the product size, quantity or purchase price. In some embodiments, the user-specific product value is measured as a difference between a determined user-specific product value and a baseline value and the difference is normalized for example against the product size, quantity, purchase price by dividing the difference by the product size, quantity or purchase price.

The normalized value is sometimes termed as product score. In some embodiments, a product score is determined for each of at least a subset of the set of products based on the user-specific product value determined for the product, and the product is selected based on the product scores determined. In one example, one or more products with the highest product scores are selected. In some embodiments, the product score of a product is equivalent to a normalized net value of product and it is determined based on the user's purchase price, which may be specific to the user based on where and when the user purchases the product and the type of deal the user may be getting (e.g., personalized offer). In some embodiments, the net normalized value of a product is calculated based on the user's purchase price and the determined product value determined based on user-specific product attribute values.

In some embodiments, each of at least a subset of a set of products is defined as a set of product attributes. A user-specific monetary value is calculated for each of the subset of the set of products based on how the user values each of the set of product attributes associated with the product. A normalized net value is calculated based on the user's purchase price for the product and the determined product value for each of the subset of the set of products. The user's purchase price may be specific to the user. A product with the highest normalized value is selected for recommendation to the user.

FIG. 1 is a block diagram illustrating an embodiment of a system 100 for recommending products to users. The products can include tangible goods such as commodities and intangible goods such as services. In the example shown, system 100 includes a server or platform 102 coupled to a user interface 104 for allowing individual users to provide input to the system (e.g., input user login info, requests, user profiles, and product preferences) and receiving output from the system (e.g., recommendations made by the system).

The user interface 104 may be a graphical user interface. In some embodiments, it is configured as a web-page, an email or other suitable form and may be executed to be displayed on one or more user devices 106 (represented by a single user device). The user devices 106 may be any suitable computing devices that enables user input into and output from the system, such as a personal computers, laptops, palmtops, notebooks, wired/wireless phones, television, and various other devices and appliances. The user devices 106 are configured to be in communications with the server 102 via various communications links 108, such as wired, wireless, interne, intranet, and/or intranet links.

The server 102 may be a centralized system having all components centralized in one geographical location or distributed computing system having various components distributed in geographically diverse locations. The server 102 may include one or more communication interfaces 110 for communicating with external computing environments, one or more processors 112 for running various processes for processing user inputs and generating user outputs including generating product recommendations for displaying to the users. The server 102 may also include one or more data storages 114 for storing various data files, for example user profiles 116 such as user login information, user preferences and user histories, product profiles 118 such as product attributes, prices, descriptions, names and locations of the retail stores, various rules, policies, and/or algorithms of the system 120. The server 102 may also be configured obtain product information from various sources and via various means. For example, the server 102 may be configured to crawl the web and gather product information from manufacturer, retailer, and/or advertiser websites, the server 102 may be coupled a user interface for receiving product information from for example users, manufacturers, retailers and/or advertisers. The operation details of the system 100 are discussed below.

Figure 2:
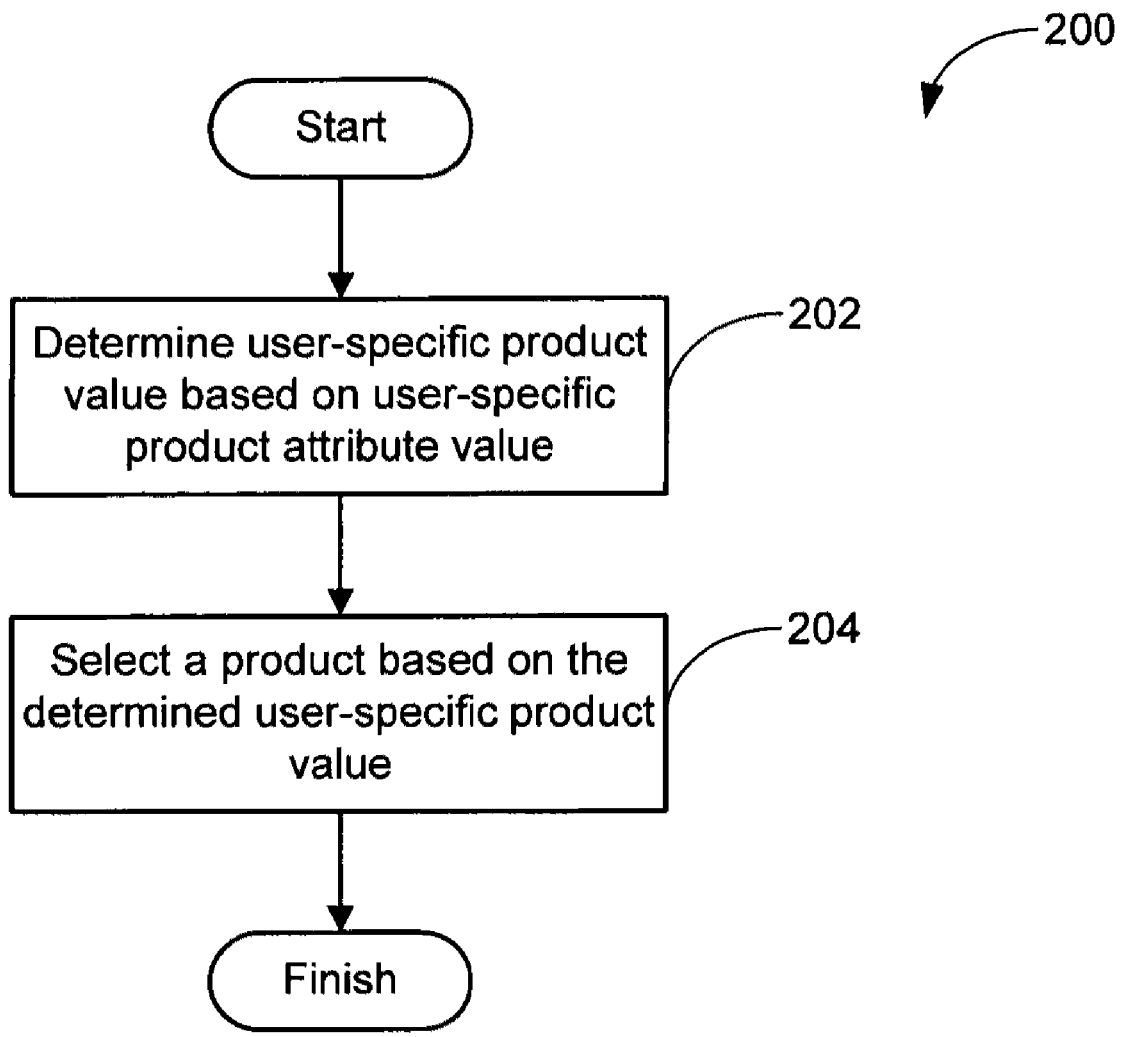
FIG. 2 is a flowchart illustrating an embodiment of a process for recommending product to user.

FIG. 2 is a flowchart illustrating an embodiment of a process 200 for selecting product. In some embodiments the process 200 is repeated or executed simultaneously to selecting one or more products. The products may be selected from sets of products that belong to different product category or subcategory. The products may be recommended for different users.

At 202, a user-specific product value is determined for each of at least a subset of a set of products. In this example, the user-specific product value is based at least in part on a user-specific product attribute value associated with an attribute of the product. The user-specific product attribute value in some embodiments reflects the value of that attribute to that user in the context of that particular product. In some embodiments, the user-specific product attribute value is determined based on at least in part on a user specified preference level for that attribute. In some embodiments, the user-specific product attribute value is determined based on a user indication of preference for a product, such as a user selection of a product from a set of plurality of products. In some embodiments, the user-specific product value is determined in a way that constraints the average of product values determined for the products in the product category or subcategory based on the input from the sliding scale controller to 0% of a baseline product value (e.g., a national average product value for the product category or subcategory or an original baseline product value constructed from component product attribute values of component product attributes for the baseline product).

In some embodiments the set of products are products of a product category with respect to which the user is interested in receiving product recommendation. In some embodiments, the set of products are selected from or belong to a product category or subcategory with respect to which the user is interested in receiving product recommendation. In some embodiments, the set of products are selected from or belong to a group of substitutable products for a product the user has selected, or has purchased, or has put on his/her shopping list. In some embodiments, determining a user-specific product value of a product includes modifying a baseline product value associated with the product with the user-specific product attribute value. In some embodiments, the baseline product value is a national average price for the category or subcategory of products the set of products are selected from or belong to. In some embodiments, the set of products are products of a product category (e.g., selected from the product category), determining a user-specific product value of a product includes modifying a baseline product value of the product category associated with the product with the user-specific product attribute value. In some embodiments, the user-specific product attribute values comprises a plurality of user-specific product attribute values, each associated with one of a plurality of product attributes of the product. In such cases, determining a user-specific product value in some embodiments comprises modifying a baseline product value (e.g., for the set of products or a product category containing the product) with the plurality of product attribute values. The details of various embodiments of product value determination are illustrated in reference to another figure below.

In some embodiments the product value of a product comprises a utility value of the product to the user that measures a use value of the product to the particular user. In some embodiments, the product value is a utility value of the product to the user. In some embodiments, the product value is measured in units of a common value such as a common monetary value or a common goods value (e.g., as a percentage of the common value). Examples of common monetary values include U.S. dollar, Canadian dollar, Australian dollar, European dollar, British pound, deutsche mark, Japanese yen, and Chinese yuan. Examples of common goods values include value of a baseline product for a product category that has a set of baseline product attributes. In some embodiments, the value of the baseline product is constructed from the baseline product attribute values of the baseline product, by for example adding up the values of all the product attributes of the baseline product. The individual product attribute values may be determined using regression analysis from pricing data of products of a category or subcategory of products. In some embodiments the baseline product value is set to be an average price (e.g., a national average price, a regional average price) of a product category or subcategory the product belongs to.

In some embodiments the user-specific product attribute value comprises a utility value of the product attribute to the user that measures a use value of the product to the particular user. In some embodiments the user-specific product attribute value is a utility value of the product attribute to the user. In some embodiments, the user-specific product attribute value is measured in units of a common value such as a common monetary currency or a common goods value (e.g., baseline product value associated with a set of products). In some embodiments, the user-specific product attribute value and/or the associated product attribute are configured to be customizable to the user via for example user inputs. The user may customize the type of the product attribute and/or may customize the associated value of the product attribute. In some embodiments, it is configured that the user may choose to not customize the types of product attribute and/or associated value and choose instead to use a default setting of the product attribute and/or associated value. In some embodiments, the default setting having a default product attribute and/or the associated default product attribute value is automatically retrieved and used as the product attribute and/or the product attribute value for determining the product values. In some embodiments, the user may input a preference value for the product attribute (e.g., via an adjustable sliding scale controller displayed in a user interface) and the preference value is automatically converted to a user-specific product attribute value.

At 204, a product is selected from the set of products based on the determined user-specific product values. In some embodiments, selecting the product based on the determined user-specific product values includes determining (e.g., calculating) a product score for each of at least a subset of the set of products based on the determined user-specific product value of the product. The selection may be carried out automatically using a processor. In some embodiments, the determined product scores are calculated by normalizing the determined user-specific product values, such as with a retail price of the product. In some embodiments, selecting the product includes selecting a plurality of products from the set of products. The products are each selected based on an associated determined user-specific product value. In some embodiments, products are rank ordered based on the calculated product scores. For example, the product with the best score (e.g., highest score or lowest score) is selected. In some embodiments, a limited number of products such as top 100 products with the best user-specific values (e.g., best product scores) are selected. In some embodiments, only a single product with the best user-specific value (e.g., best product score) is selected. In some embodiments, each of at least a subset of the selected products is a unique shelf product sold by a specific store of chain of stores and has a specific retail price point. In some embodiments, each of at least a subset of the selected products identified by a product id (e.g., unique product name, product description and/or product UPC number), the retail store selling the product, the location of the retail store, and the retail price of the product. The retail price may be determined via user, manufacturer, retailer, and/or advertiser inputs, and/or via web crawling from manufacturer, retailer, and/or advertiser websites. In some instances, the determined retail prices may differ from the actual retail prices of the products. The quality and accuracy of the actual prices may be evaluated using one or more criteria, such as the source, when was the price information gathered (e.g., with in a predetermined period of time such as a week, and retail advertising cycle, etc.). In some embodiments, the selected products are communicated to the user and displayed on the user devices. For example, the selected products may be emailed, texted, faxed, twitted, uploaded onto a website (e.g., Facebook), downloaded to a user device or otherwise presented for viewing by the user. In some embodiments, the selected products are presented to the user together with the user's current product selection for the product category (e.g., in the form of a shopping list) associated with the selected products. In some embodiments, the reasons for the recommendation, such as product attributes contributed to the recommendation, is identified and communicated to the user.

In some embodiments, one or more products are automatically selected and presented to the user. The user picks one or more products from the set of a plurality of products. In some embodiments, the product picked by the user belongs to the one or more products selected and presented to the user. In some embodiments, the product picked by the user does not belong to the one or more products selected and presented to the user. In some embodiments, one or more user-specific product attribute preferences and/or values associated with one or more product attributes are readjusted automatically based on the product pick of the user. For example, if a user selects one or more organic products but the user has specified a low product attribute preference and/or value that reflects a low preference or dislike for organic products, the user-specific product value for the product attribute "organic" may be automatically adjusted to reflect a higher preference for organic product based on the fact that the user has selected the one or more organic products.

Figure 3:
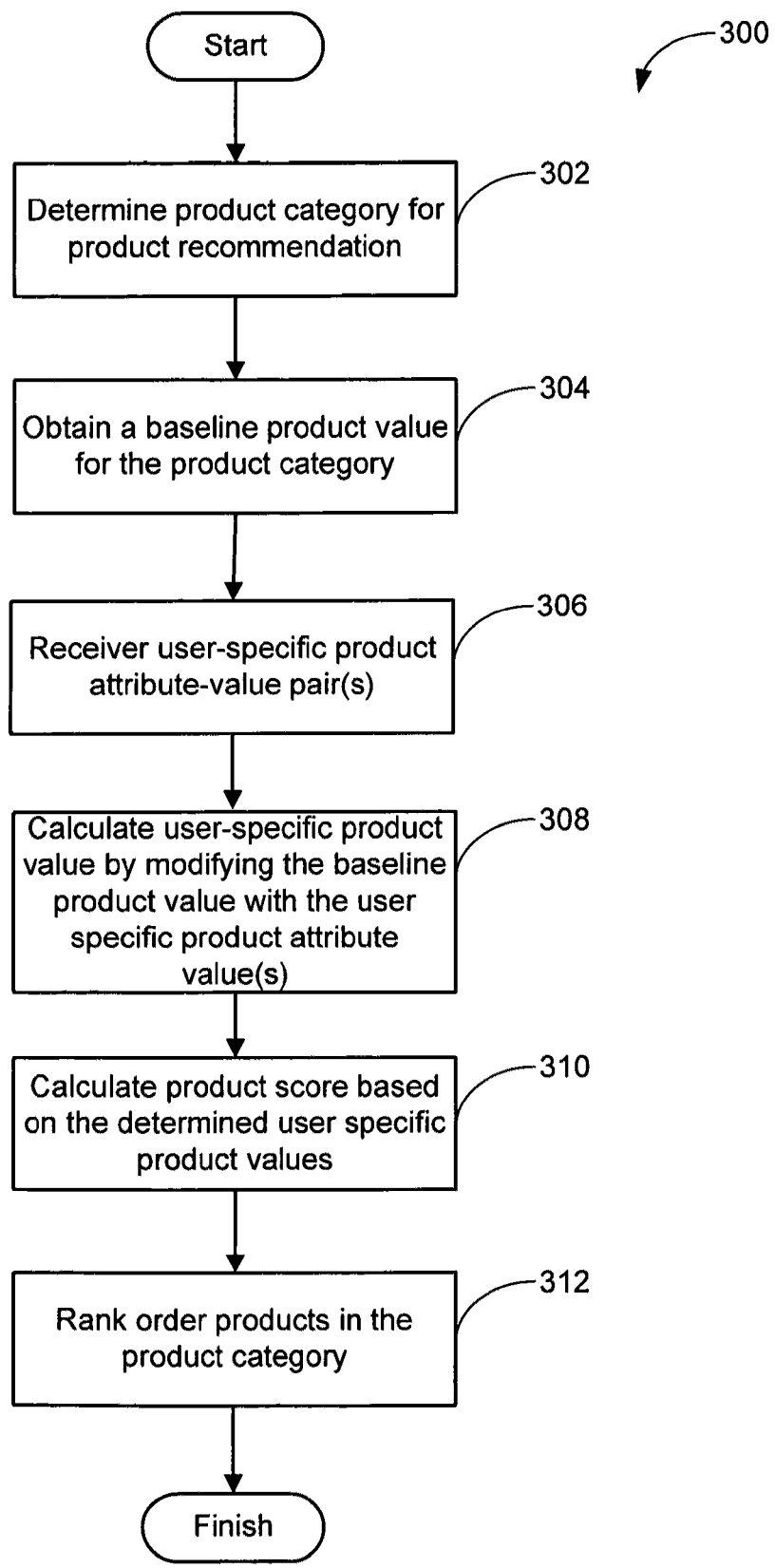
FIG. 3 is a flowchart of an embodiment of a process for determining user-specific product value based on user-specific product attribute value.

FIG. 3 is a flowchart of an embodiment of a process 300 for determining user-specific product value based on user-specific product attribute value. At 302, a product category for product recommendation to a user is determined. In some embodiments the product category is directly received from the user. For example, the user selects "fried beans" from a list of available predefined types of product categories or subcategories displayed on a graphical user interface as the product category of interest for receiving product recommendation. In some embodiments the product category is determined from an indication received from the user such as an incomplete or complete product description from the user, the details of which are illustrated in reference to FIG. 4.

At 304, a baseline product value for the user selected product category is determined. In some embodiments the baseline product value is retrieved from data storage. Various algorithm and/or methods can be used to generate and store the baseline product value for each product category. The baseline product value for a product category represents a value (e.g., utility value) of a product having a baseline set of product attributes. In some embodiments, the baseline product value is measured or quoted in units of a common value such as units of a common monetary value. For example, for the product category of refried beans, the baseline product value is $1.00. This represents the utility value of refried beans having the baseline product attributes of "8 oz size", "canned", "non-organic" and "of medium quality". In some embodiments, the baseline product value is set as a unit and is used to measure the values of other values of other products in the product category. That is other product values of the product category are measured in units of the baseline product value of the product category. For example, values of other products in the refried beans category will be measured in units of the baseline refried beans, such as a percentage of the value of the baseline refried beans.

At 306, user-specific types of product attributes and/or associated attribute values are received. In some embodiments, the user selects, from a list of available predefined types of product attributes, one or more types of product attributes that the user care the most about and that will make a significant difference to which product the user will select over other products in the product category or subcategory. The user then defines personalized or user-specific values for each of at least a subset of the one or more selected product attributes. In some embodiments the user can choose to use a default setting of types of product attributes and values but has the option of customizing the default setting to suit the user's personal preferences.

At 308, a user-specific product value specific to the user is determined for each of at least a subset of products of the product category, the user-specific product value is determined by modifying the baseline product value with the user selected and defined user-specific product attribute values, so that the contribution of the product attributes to the product value can be taken into consideration and calculated into an overall value of the product. In some embodiments, the user-specific product value of a product in a product category is calculated using the following equations:

$$V = V_b \prod_a m_a$$

Where V is the user-specific product value of the product; $V_b$ is a baseline product value of a product category the product is in; and $m_a$ is the product attribute value for product attribute a and is expressed as (1+x %), where x is a percentage increase in value of the product having the attribute a with respect to products having no product attribute a.

At 310, a product score is determined based on the determined user-specific product value. In some embodiments, a product score n is calculated using the following equation:

$$n = \frac{V - P}{V}$$

Where n is the product score or normalized product value and is calculated by normalizing the product value against the retail price of the product. In this way, value per unit price of the product is calculated, indicating to the user whether the particular product as priced is a good deal.

In some embodiments a product score n is calculated using the following equation:

$$n = \frac{V - P}{V}$$

Where n is the product score or normalized product value and is calculated by normalizing the product value against the retail price of the product. In this way, value per unit price of the product is calculated, indicating to the user whether the particular product as priced is a good deal.

In one example, the product category being considered for product recommendation for a user is the refried beans, the baseline product value for the product category $V_b$ is $1.00, three product attribute-value pairs are inputted by the user includes:

| | |
|---|---|
| Attribute 1: Vegetarian | Attribute Value ($m_1$): 1.2 |
| Attribute 2: Organic | Attribute Value ($m_2$): 1.1 |
| Attribute 3: 16 oz | Attribute Value ($m_3$): 1.5 |

The product value V measured in dollar is calculated as follows:

$$V = \$1.00 \times 1.2 \times 1.1 \times 1.5 = \$1.98$$

If the retail price of the product is $1.00, a user-specific product score or is calculated by normalizing the value of the product to the price of the product is calculated as follows:

$$n = n = \frac{V - P}{V} = (1.98 - 1.0)/1.98 = 0.50$$

User-specific product values and scores are calculated for each of at least a subset of a set of products in the product category. A list of recommended products can be generated based on the product scores, wherein the products on the list are rank ordered according to the product score for presentation to the user. In some embodiments, only a certain number of products with the best scores (e.g., the lowest scores or the highest scores depending on how the products are scored) that represent the most desirable products to the user are placed on the list. In the example shown here, the products with the highest scores are preferably placed at the top of the list. In some embodiments, all products in the set of products, including products on the list and products not on the list, are displayed to the user, where the products on the list are displayed at the top and highlighted or otherwise emphasized as the selected products to the user.

Figure 4:
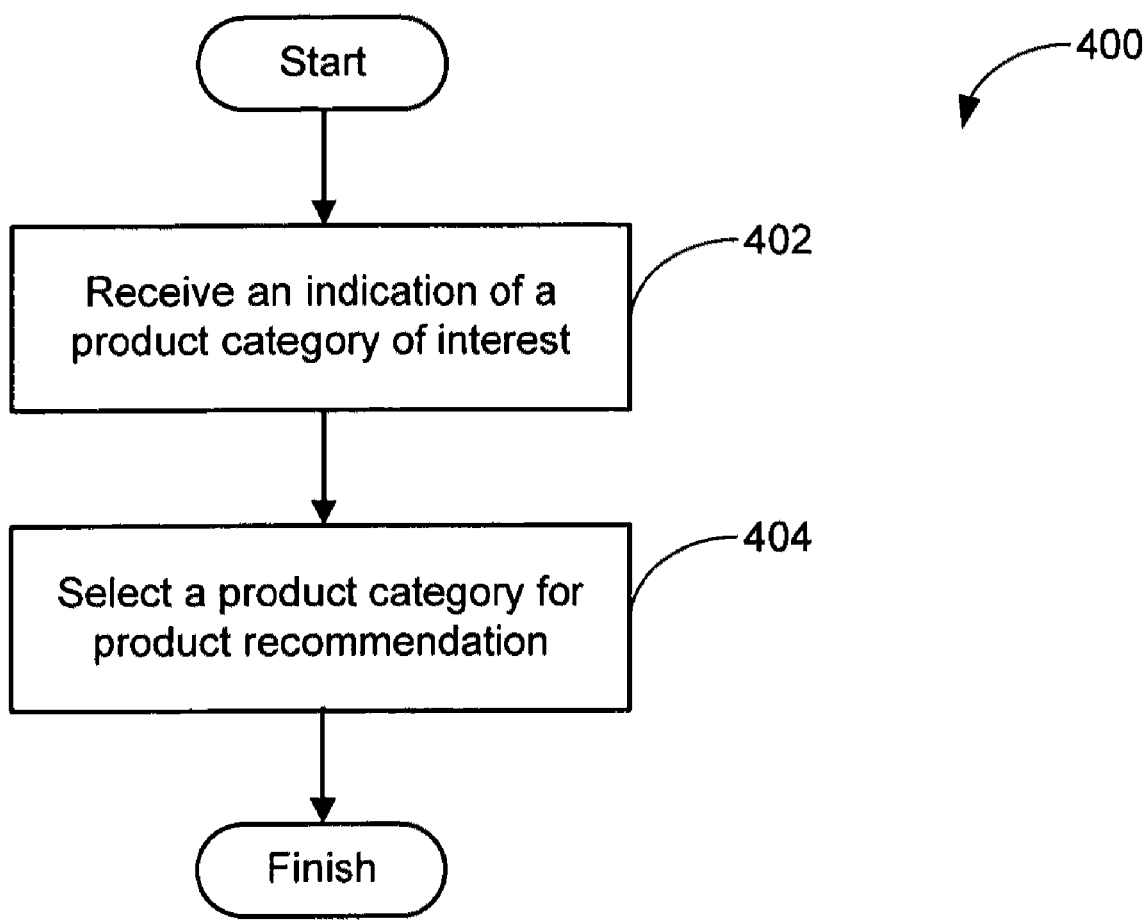
FIG. 4 is a flowchart of an embodiment of a process for determining a product category for product recommendation.

FIG. 4 is a flowchart of an embodiment of a process 400 for determining a product category for product recommendation. At 402, an indication of product category interested by the user for product recommendation is received. In some embodiments, the indication comprises a partial or complete description of a product of interest to the user. In some embodiments, the indication includes a product category. In some embodiments, the indication is received via direct user input. At 404, a product category is selected based on the indication. In some embodiments, selecting the product category includes selecting one or more candidate product categories or subcategories based on the indication, and presenting the candidate product categories and/or subcategories to the user and allowing the user to select the product category and/or subcategory from the candidate product categories and/or subcategories for product recommendation. In some embodiments, the indication product description is parsed for known product attributes. The parsed product attributes are searched against product profiles of at least a subset of products in each of at least a subset of product categories. In some embodiments, the product category and/or subcategory with the most matches, that is the product category and/or subcategory with the most products having their product profiles include the parsed product attributes, is determined as the product category and/or subcategory of interest to the user for product recommendation. In some embodiments, one or more product categories with the most matches, that is one or more product categories with most products having its profiles include the parsed product attributes, are determined as the candidate product categories of interest to the user for product recommendation. In some embodiments the candidate product categories of interest are presented to the user, allowing the user to select the one category for receiving product recommendation.

Figure 5:
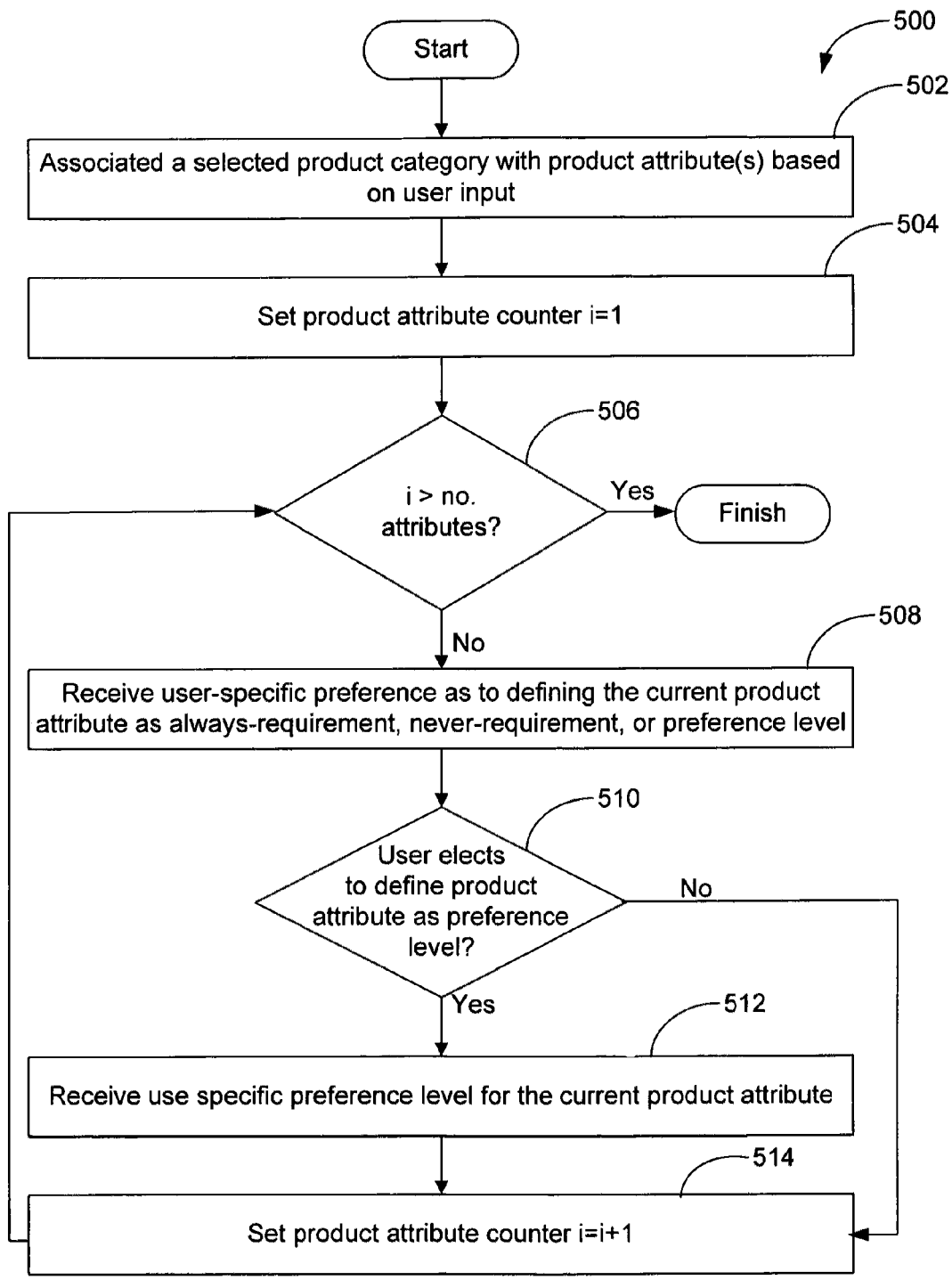
FIG. 5 is an embodiment of a process for receiving user product selection criteria.

FIG. 5 is an embodiment of a process 500 for receiving user product selection criteria. In some embodiments, in addition to defining product attributes as preference levels by assigning to them levels, weights and/or values that can take on a whole range of values such as numerical values, the product attributes can also be defined as requirements, which are requirements that the products being selected must include or exclude certain product attributes as defined by the requirements. The product attribute requirements can be used to filter products, for example to filter out products that do not meet the requirements for product recommendation, to include only products that meet the requirements. In some embodiments, the product attribute requirements include requirements that one or more product attributes must be present. In some embodiments the product attribute requirements includes requirements that one or more product attributes must be absent. The product preferences and weights can be used to determine or assign product scores and/or values that help to rank order the products for recommendation. Since preference levels for different product attributes can be used to adjust the product value based on which product recommendation is made, user can weigh and make trade-offs among two or more product attributes in product selection by adjusting product attribute preference levels associated with different product attributes.

At 502, a product category for product recommendation is associated with one or more types of product attributes based on the user input. In some embodiments, a list of available types of product attributes for the product category is presented to the user for selection. The user selects from the list one or more types of product attributes. The selected types of product attributes presumably are product attributes that the user cares the most about and will make a significant difference in the user's decision in selecting one product over another product in the product category. In some embodiments, the available product attributes may be generated based on at least in part on the product category interested by the user for product recommendation. In some embodiments the available product attributes may be generated based on user profile, past user product selection history, past user input regarding product attributes. In some embodiments, the available product attributes are organized into and presented to user according to categories each of which will affect one of high level objectives of the user. For example, the available product attributes may be organized into at least one or more of the following categories: product or product category/subcategory specific attributes, diet, health and nutrition related attributes, allergen related attributes, life style related attributes, environmental related attributes such as product carbon footprint score, social or society related attributes such as animal-friendly, free of child labor, and financial objectives. The selected product attributes are associated with the product category. At 504, a product attribute counter i is set to be 1. The product attribute counter indicates the current product attribute being processed. At 506, the process checks whether the product attribute counter is greater than the number of product attributes associated with the product category. If the answer is yes, the process ends, if the answer is no, the process proceeds to 508. At 508, a user's choice as to whether to define the current product attribute as an always-requirement, a never-requirement, or a preference level is received. In some embodiments, these choices are presented to the user via a graphical user interface. The user then selects one of the choices as an input into the system. For example, the user may select for the product attribute "organic" for the product category "refried beans" as an always-requirement, requiring all refried beans products recommended to the user to be organic. The user may select the product attribute "organic" as a never-requirement, requiring all products recommended not being organic. The user may select the product attribute "organic" as a preference level, indicating that the user prefers products that are organic, but that preference may be balanced out with other product attributes such as price and brand. At 510, the process determines if the user has elected to define the current product attribute as a preference level. If yes, the process proceeds to step 512, if no, the process proceeds to step 514. At 512, a user-specific preference level for the current product attribute is received, the user-specific preference level are specific to and/or customizable to the user. In some embodiments, the user specific product attribute preference level is received via a user adjustable sliding scale controller displayed in a graphical user interface. The user-specific preference level is adjustable by adjusting a pointer on the sliding scale controller. At 514, the product attribute counter i is set to i+1. The process returns to step 506 until the product attribute counter is greater than the number of product attributes associated with the product category.

Figure 6:
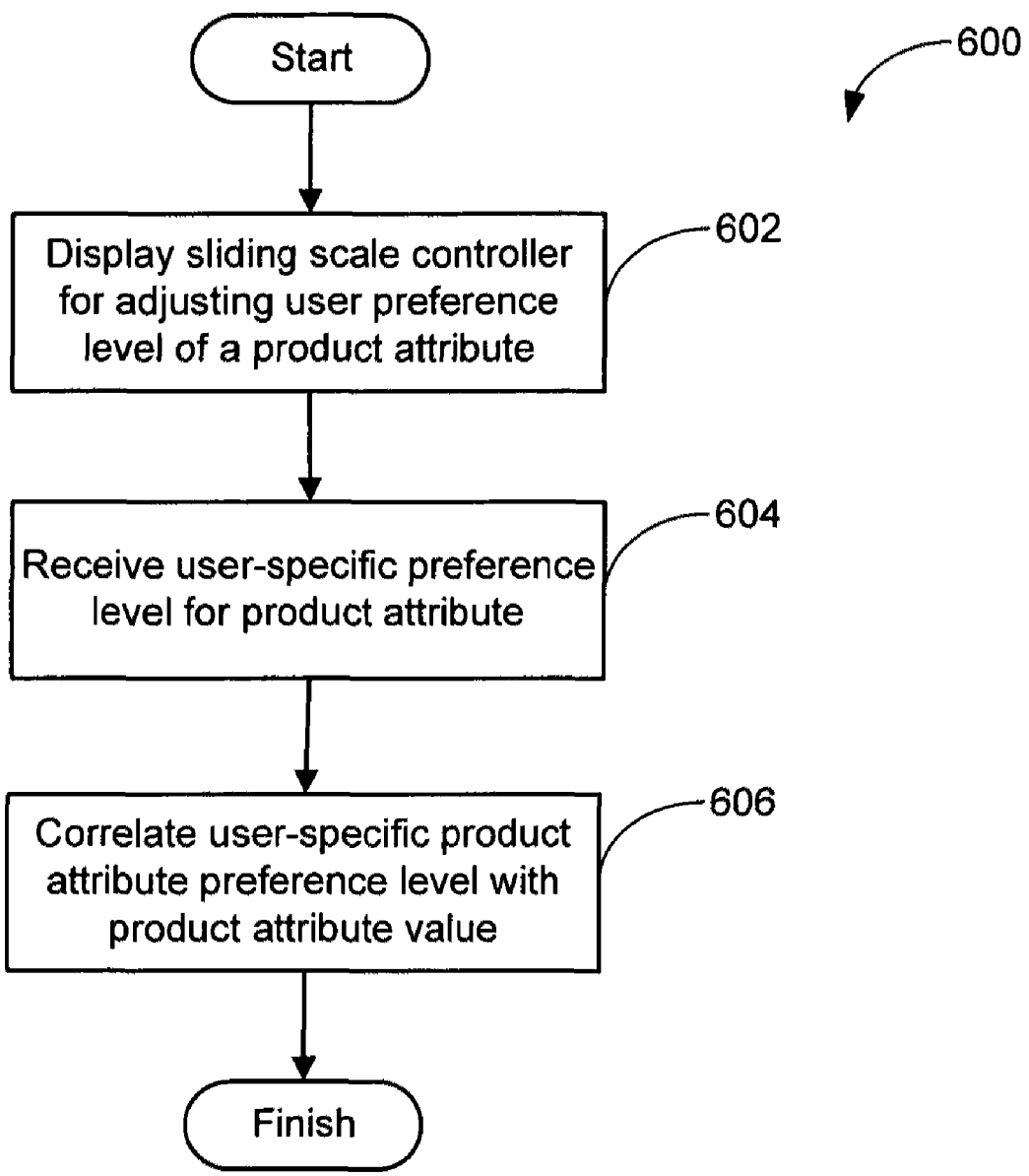
FIG. 6 is an embodiment of a process for receiving a user defined attribute preference level and determining a user-specific product attribute value based on the user defined attribute value.

FIG. 6 is an embodiment of a process for receiving a user defined attribute preference level or attribute value. The process may be repeated for different product attributes. At 602, a sliding scale controller for adjusting the preference level of the product attribute is displayed via a graphical user interface, where the sliding scale controller includes a mechanism, in this example a pointer, that can be adjusted along the sliding scale controller by the user dragging the pointer along the length of the sliding scale controller. In some embodiments, the sliding scale controller is one of a plurality of sliding scale controllers associated with a plurality of product attributes generated and displayed. In some embodiments, in order to make the slider responsive to user adjustment, the necessary data for operating the slider is sent and stored locally while the user is adjusting the controller.

In some embodiments, different positions on the sliding scale controller corresponds directly to different product attribute values for the product attribute associated with the controller. In some embodiments, different positions on the sliding scale controller correspond to different weights and/or preference levels user assign to the product attribute. The weights and/or preference levels can be automatically converted to product attribute values for product attribute associated with the controller. In some embodiments, different positions on the sliding scale controller correspond to different preference balance between two product attributes scale controller corresponds to different attributes, adjusting the controller in favor of one product attribute necessarily decrease the preference for the opposing product attribute. In one example, different positions on the sliding scale controller correspond to different balance between "organic" product attribute and "cheap price". If the user increases the preference for "organic" product, it necessarily lowers the user's preference for "low price product".

In some embodiments, an indicator that indicates a position on the adjustable sliding scale controller that corresponds to a product attribute value that an average shopper assigns to the product attribute associated with the sliding scale controller. In some embodiments, this position is a mid-point of the adjustable sliding scale controller. In some embodiments, the plurality of sliding scale controllers has the same scale range (e.g., all have a range of –100% to 100% of a baseline product value). In some embodiments, the plurality of sliding scale controllers have different scale ranges (e.g., one controller may have a range of –5000% to 5000% of a baseline product value) and the scale range may be determined based on or adapt to the type of product attribute. For example, a product attribute of made in gold may affect the value of a product dramatically (e.g., relative to a baseline product value), therefore the sliding scale controller associated with the product attribute of made in gold may have a larger scale range (e.g., –1000% to 1000%). A product attribute of spicy will not include the value of the product dramatically, so the sliding scale controller associated with the product attribute of spicy will have a smaller scale range (e.g., –1% to 1%).

In some embodiments, the sliding scale controller is color coded to indicate a range of product attribute value where products with the product attribute associated with the controller may be selected from the set of a plurality of products for recommendation to the user. In some embodiments, the sliding scale controller is color coded to indicate a range of product attribute preference value where products with the product attribute associated with the controller will always be selected from the set of a plurality of products for recommendation to the user. In some embodiments, the sliding scale controller is color coded to indicate a range of product attribute preference or value where products with the product attribute associated with the controller will never be selected from the set of a plurality of products for recommendation to the user.

At 604, a user-specific product attribute preference level is received. In some embodiments this is reflected by a position of the sliding scale controller pointer received. At 606, the user-specific weight and/or preference level for the product attribute is correlated with a value (e.g., utility value) of the product attribute specific to the user based on a predefined conversion scheme. In some embodiments, the value is measured in units of a common value, such as a common monetary value (e.g., dollar) or a common goods value (e.g., baseline product value).

Figure 7:
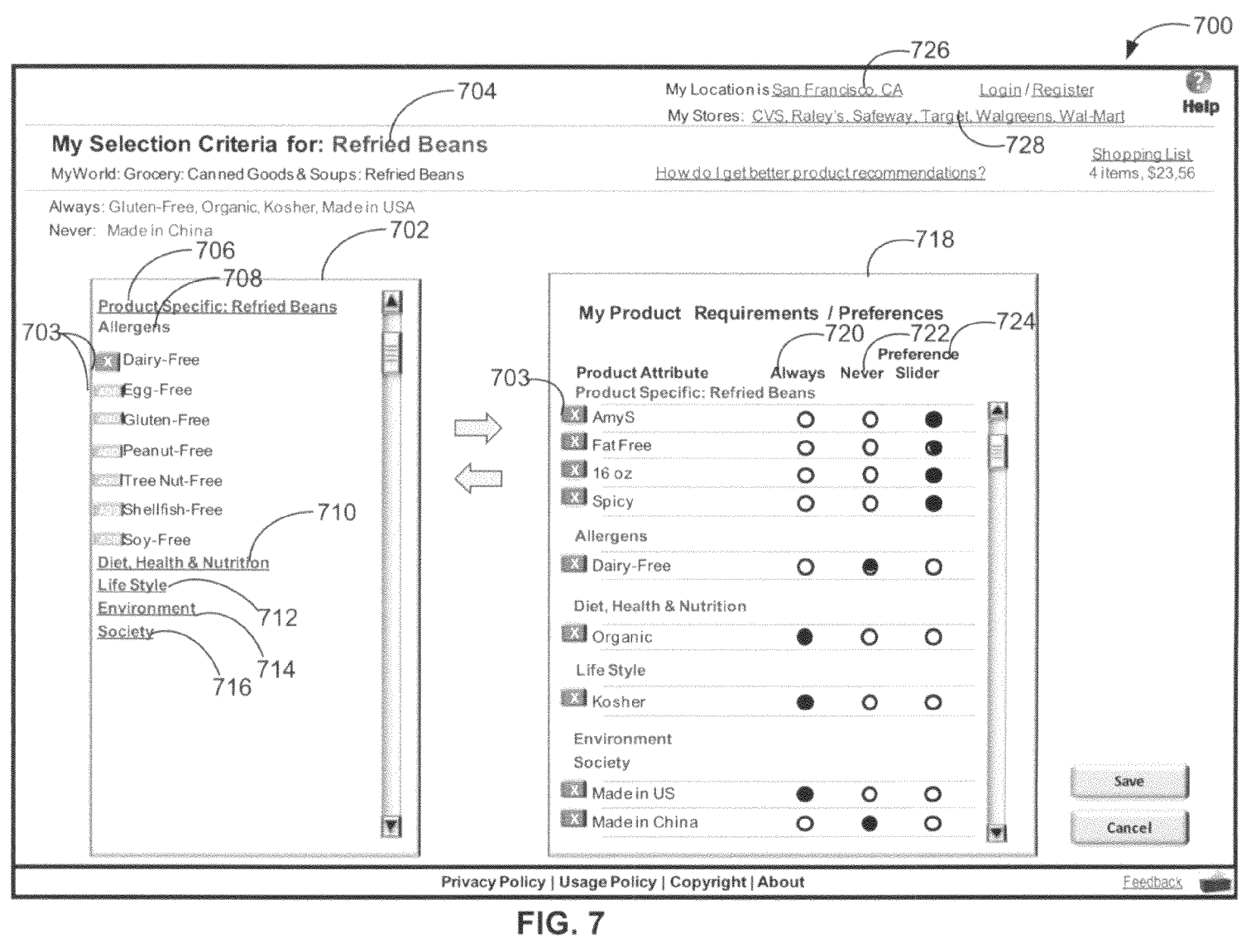

FIG. 7 is a screen shot of a graphical user interface 700 for receiving user selection of product attribute for association with a product category for receiving product recommendation for the product category, and for receiving user selection as to whether to define a selected product attribute as an always-requirement, never-requirement, or preference level. In the example shown, a list of available product attributes 702 associated with the product category Refried Beans 704 is displayed. The list of available product attributes 702 include and are organized by different product attribute types. In the specific example, the list of product attributes include product-specific attributes 706, allergen related product attributes 708, diet/health/nutrient related product attributes 710, life style related product attribute 712, environment related product attributes 714, and social/society related product attributes 716. In the example shown, a user selects a plurality of product attributes from the available product attributes 702 associated with the product category. Add/Delete Buttons 703 that toggle between "delete" and "add" can be used to add or delete product attribute. The selected plurality of product attributes 718 is displayed together with choices of defining the attribute as an always-requirement 720, a never-requirement 722 and selecting a a preference level slider 724 for each of the product attributes selected by the user. The user input via the graphical user interface can be saved with the user profile. The graphical user interface 700 also displays the user geographical location 726 and the user-selected preferred stores 728.

Figure 8:
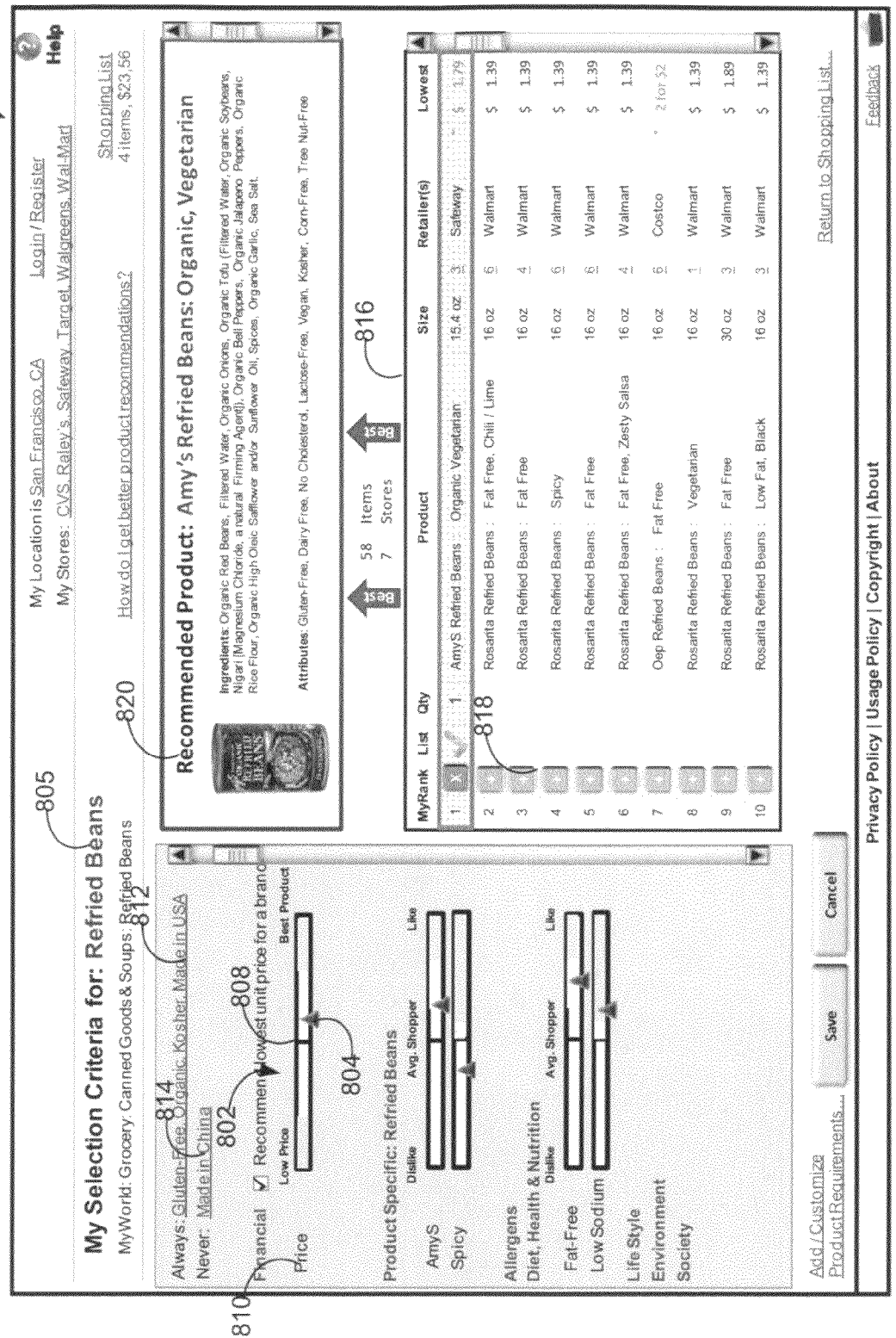
FIG. 8 is a screen shot of a graphical user interface for receiving user specified product attribute preference level and for presenting a list of products selected for recommendation to user.

FIG. 8 is a screen shot of a graphical user interface for receiving user specified product attribute preference level and for presenting a list of products selected for recommendation to user. In the example shown, a sliding scale controller 802 having an adjustable pointer 804 is displayed for each of the product attributes 806 that user selects to be defined as preference levels for recommending products in refried beans product category 805. A preference level of an average shopper 808 serves as a reference point and is indicated on the sliding scale controller 802. In some embodiments, the scale of the sliding scale controller is normalized by an average shopper preference level. The sliding scale controller allows user to input user-specific product attribute preference level for a product attribute. In some instances, the sliding scale controller allows user to adjust a preference balance between two attributes. In the example shown, the sliding scale controller for the price attribute 810 allows user to adjust user-specific preference balance for low price and high product quality. When a user adjusts the pointer towards "low price" and away from "best product", user preference level for low price is increased while user preference level for high product quality is decreased. In the example shown, product attributes that are defined as always-requirements 812 and product attributes that are defined as never-requirements 814 are listed.

A list 816 of products selected from products in the refried beans category is displayed. In the example shown, the list rank order products according product scores determined based on user-specific product values determined based at least in part on the user-specific product attribute preference levels specified using the sliding scale controller. In the example shown, each product on the list is identified by product name, size, retailer, and retail price at the retailer. Select/Deselect buttons 818 that toggle between "select" and "deselected" can be used for user to select or deselect products from the recommended list of products for a product category. In the example shown, detailed description of the product selected by user 820 is displayed in a separate pane. In the example shown, user can readjust product attribute preference levels and the readjustments of the product attribute preference levels results in automatically re-selection and re-ranking of the list 816 of products for recommendation.

FIG. 9 is a screen shot of an embodiment of a graphical user interface 900 for displaying product recommendation to user. For each item 902 on the user's shopping list that includes a plurality of shopping items, a plurality of products 904 are evaluated and ranked and a recommended product 906 (e.g., the product with the best product score) is displayed next to the shopping item 902. The list of products evaluated can be drilled down if the user clicks on the icon 904 for the list of the evaluated products. Each of the recommended products includes a product name/description 908, retailer store selling the product 910, and a price 912 of the product at the retailer store. The product prices are evaluated based one or more criteria, such as that it was obtained within a predetermined period of time (e.g., with a week). Check marks 914 are used to identify product prices that meet the one or more criteria.

Figure 10:
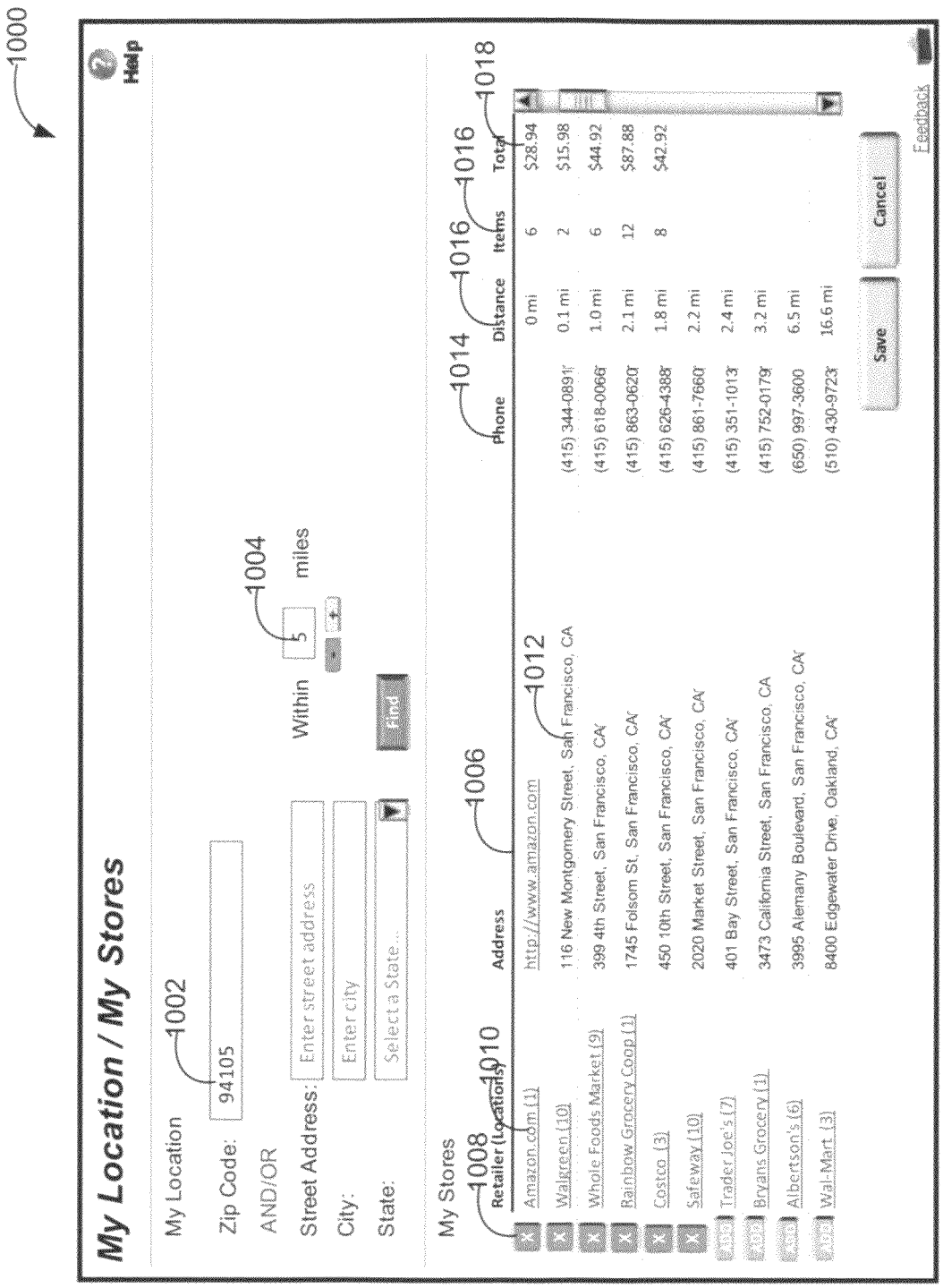
FIG. 10 is a screen shot of an embodiment of a graphical user interface for receiving user profile information.

FIG. 10 is a screen shot of an embodiment of a graphical user interface 1000 for receiving user profile information. In the example shown, the graphical user interface is configured to receive user input of his/her location (e.g., user zip code) 1002 or alternatively the address of the user, and to receive a radius 1004 within which the user is interested in shopping. A list of available stores 1006 within the radius of the shopper's location is automatically displayed once the user location and radius parameters are defined by the user. In the example shown, stores within 5 mile radius of the user's zip code are displayed. Select/Deselect buttons 1008 that toggle between "select" and "deselect" are displayed to allow user to select one or more preferred stores. The stores are identified by store names 1010, address 1012, phone numbers 1014, distances from the user's location 1016 and the number of shopping items on the user's shopping list it sells 1016, and the total cost of the items sold in the store 1018. The information presented can help user decide which stores to shop. For example, the user may pick the closest stores, stores that have the largest number of shopping items.

Figure 11:
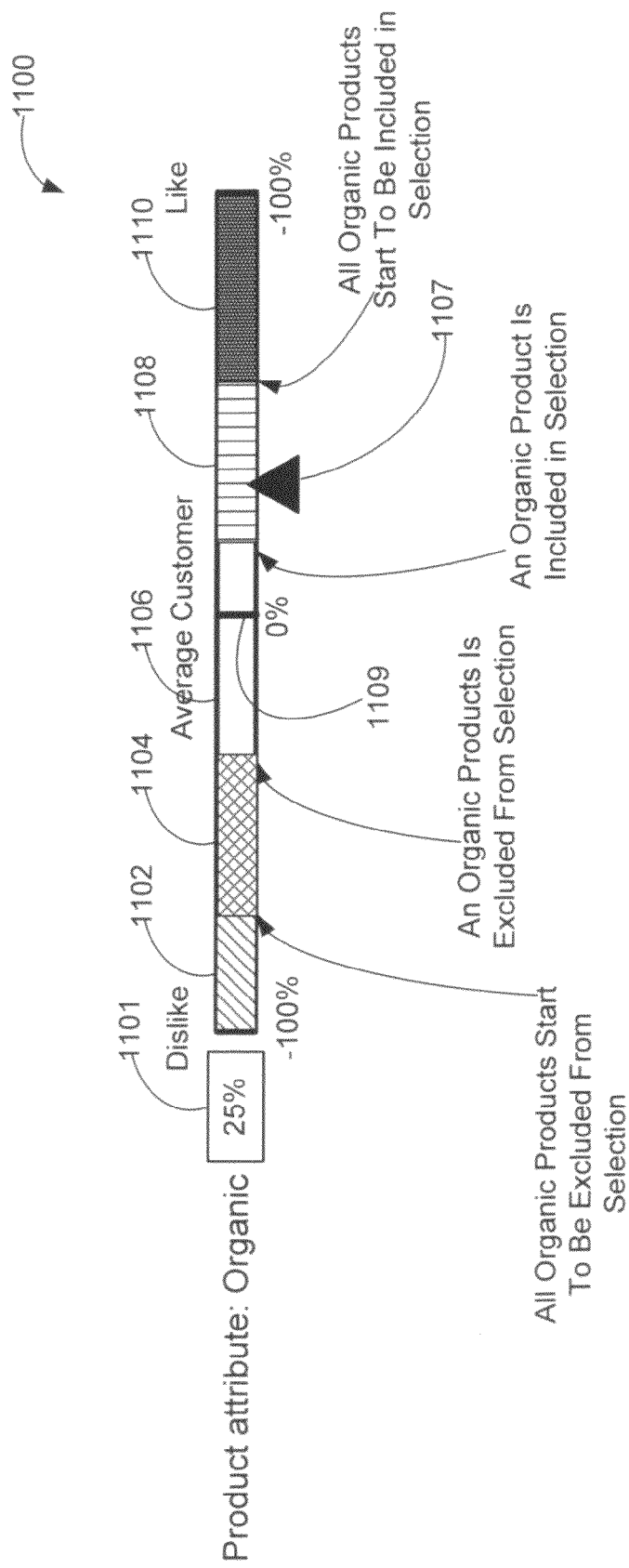
FIG. 11 is a schematic illustration of a color coded adjustable sliding scale controller.

FIG. 11 is a schematic diagram of a color coded adjustable sliding scale controller 1100 for adjusting user-specific product attribute value. The adjustable sliding scale controller has a scale range of −100% to 100%. A midpoint 1109 represents an average shopper's preference for the product attribute. The sliding scale also includes a display field 1101 for displaying a numerical product attribute value associated with a current user adjustment of the scale. An adjustable indicator 1107 can be adjusted along the controller to adjust a user's preference value for the product attribute. A section of the sliding scale controller is color coded dark red 1102 to indicate a range of product attribute preference or value where products with the product attribute associated with the controller will never be selected from the set of a plurality of products for recommendation to the user. A section of the sliding scale controller is color coded light red 1104 to indicate that a product with the product attribute may be excluded from being selected (e.g., for recommendation to the user). A section of the sliding scale controller is color coded white 1106 to indicate that the product attribute does not influence whether a product will be excluded or included for selection for recommendation to the user. A section of the sliding scale controller is color coded darker green 1108 to indicate a range of product attribute preference value where products with the product attribute associated with the controller will always be selected from the set of a plurality of products for recommendation to the user. A section of the sliding scale controller is color coded light green 1110 to indicate a range of product attribute value where products with the product attribute associated with the controller may be selected from the set of a plurality of products for recommendation to the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of selecting a product for purchase by a consumer from a retailer, comprising:
    providing a website for the consumer to create a shopping list with weighted product attributes for a plurality of products;
    determining a baseline product value for each of the plurality of products;
    determining a product value specific to the consumer, wherein the product value is based on the baseline product value and the weighted product attributes associated with the products specific to the consumer;
    determining a product score based on the product value;
    rank ordering the shopping list based on the product score;
    providing the rank-ordered shopping list to the consumer to assist with purchasing decisions; and
    utilizing the rank ordered shopping list to control the purchasing decisions between the consumer and retailer by enabling the consumer to select the product for purchase from the retailer based in part on the product score.

2. The method of claim 1, further comprising displaying a graphical user interface for receiving the weighted product attributes from the consumer.

3. The method of claim 1, further comprising:
    displaying an adjustable sliding scale controller; and
    receiving an indication of the weighted product attributes from the consumer using the adjustable sliding scale controller.

4. The method of claim 3, wherein different positions of the adjustable sliding scale controller correspond to different degrees of consumer preference for the weighted product attributes.

5. The method of claim 3, wherein the sliding scale controller is color coded to indicate a range of weighted product attributes.

6. The method of claim 1, further including determining the product value by $PV0*(1+X_{A1}\%)*(1+X_{A2}\%)*(1+X_{A3}\%)*\ldots*(1+X_{An}\%)$, where PV0 is the baseline product value and $X_{An}$ as a percentage increase or decrease in value of the product to the consumer, given the weighted product attributes An.

7. The method of claim 1, further including assigning monetary units of measure to the baseline product value and product value.

8. The method of claim 1, wherein the baseline product value is a national average price or regional average price.

9. The method of claim 1, further including utilizing the rank ordered shopping list to enable the consumer to consider the product for purchase from the retailer based on the weighted product attributes, product value, or product score.

10. A method of selecting a product for purchase by a consumer from a retailer, comprising:
    providing a plurality of weighted product attributes for a plurality of products;
    determining a baseline product value for each of the plurality of products;
    determining a product value for the consumer based on the baseline product value and the weighted product attributes;
    determining a product score based on the product value;
    rank ordering the shopping list based on the product score; and
    controlling transactions between the consumer and retailer by enabling the consumer to evaluate the product for purchase from the retailer based in part on the product score.

11. The method of claim 10, further including providing a website for the consumer to create the shopping list with the weighted product attributes for the products.

12. The method of claim 10, further including providing the rank-ordered shopping list to the consumer to assist with purchasing decisions.

13. The method of claim 10, further including displaying a graphical user interface for receiving the weighted product attributes from the consumer.

14. The method of claim 13, further including modifying the weighted product attributes through the graphical user interface.

15. The method of claim 10, further including:
displaying an adjustable sliding scale controller; and
receiving an indication of the weighted product attributes from the consumer using the adjustable sliding scale controller.

16. The method of claim 15, wherein different positions of the adjustable sliding scale controller correspond to different degrees of consumer preference for the weighted product attributes.

17. The method of claim 15, wherein the sliding scale controller is color coded to indicate a range of weighted product attributes.

18. The method of claim 10, further including determining the product value by $PV0*(1+X_{A1}\%)*(1+X_{A2}\%)*(1+X_{A3}\%)*\ldots*(1+X_{An}\%)$, where PV0 is the baseline product value and $X_{An}$ as a percentage increase or decrease in value of the product to the consumer, given the weighted product attributes An.

19. The method of claim 10, further including utilizing the rank ordered shopping list to enable the consumer to consider the product for purchase from the retailer based on the weighted product attributes, product value, or product score.

20. A computer program product usable with a programmable computer processor having a computer readable program code embodied in a computer usable medium for selecting a product for purchase by a consumer from a retailer, comprising:
providing a plurality of weighted product attributes for a plurality of products;
determining a baseline product value for each of the plurality of products;
determining a product value for the consumer based on the baseline product value and the weighted product attributes;
determining a product score based on the product value;
rank ordering the shopping list based on the product score; and
controlling transactions between the consumer and retailer by enabling the consumer to evaluate the product for purchase from the retailer based in part on the product score.

21. The computer program product of claim 20, further including providing the rank ordered shopping list to the consumer to assist with purchasing decisions.

22. The computer program product of claim 20, further including displaying a graphical user interface for receiving the weighted product attributes from the consumer.

23. The computer program product of claim 22, further including modifying the weighted product attributes through the graphical user interface.

24. The computer program product of claim 20, further including:
displaying an adjustable sliding scale controller; and
receiving an indication of the weighted product attributes from the consumer using the adjustable sliding scale controller.

25. The computer program product of claim 24, wherein different positions of the adjustable sliding scale controller correspond to different degrees of consumer preference for the weighted product attributes.

26. The computer program product of claim 20, further including determining the product value by $PV0*(1+X_{A1}\%)*(1+X_{A2}\%)*(1+X_{A3}\%)*\ldots*(1+X_{An}\%)$, where PV0 is the baseline product value and $X_{An}$ as a percentage increase or decrease in value of the product to the consumer, given the weighted product attributes An.

27. The computer program product of claim 20, further including utilizing the rank ordered shopping list to enable the consumer to consider the product for purchase from the retailer based on the weighted product attributes, product value, or product score.

* * * * *